(12) United States Patent
Train et al.

(10) Patent No.: US 7,246,194 B2
(45) Date of Patent: *Jul. 17, 2007

(54) INTERFACE MODULE FOR USE WITH A FIELDBUS DEVICE NETWORK AND WITH INTERNET AND NON-INTERNET BASED PROCESS CONTROL NETWORKS

(75) Inventors: Robert Train, Bognor Regis (GB); Marcos A. V. Peluso, Chanhassen, MN (US); Robert J. Karschnia, Chaska, MN (US); Eric D. Rotvold, Inner Grove Heights, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/931,165

(22) Filed: Aug. 31, 2004

(65) Prior Publication Data

US 2005/0066104 A1   Mar. 24, 2005

Related U.S. Application Data

(63) Continuation-in-part of application No. 10/354,525, filed on Jan. 30, 2003.

(51) Int. Cl.
*G06F 13/36* (2006.01)
*G06F 13/20* (2006.01)
*G06F 13/10* (2006.01)
*G06F 13/40* (2006.01)

(52) U.S. Cl. .................. 710/311; 710/305; 710/310

(58) Field of Classification Search ........ 710/305–306, 710/311, 315
See application file for complete search history.

(56) References Cited

U.S. PATENT DOCUMENTS 5,410,730 A    4/1995   Longsdorf et al. .......... 395/800

(Continued)

OTHER PUBLICATIONS

Smar International; "Smar: First in Fieldbus"; Smar International; Aug. 14, 2002; available online at <https://www.smar.com/shownews.asp?Id=22>.*

(Continued)

*Primary Examiner*—Paul R. Myers
*Assistant Examiner*—Ryan Stiglic
(74) *Attorney, Agent, or Firm*—Marshall, Gerstein & Borun LLP

(57) ABSTRACT

An interface module is operatively connected to a Fieldbus process control network and to at least one non-Fieldbus process control network to facilitate the exchange of process control information between the networks. The interface module stores a database in which the process control parameters of the function blocks in the field devices of the Fieldbus process control network are mapped to corresponding process control parameters of the non-Fieldbus process control network. Once the Fieldbus process control parameters are mapped to the non-Fieldbus process control parameters, the interface module is adapted to transmit request messages on the Fieldbus process control network to the Fieldbus field devices for the current values of the process control parameters, receive response messages from the Fieldbus field devices, and store the current values of the process control parameters in the database. The interface module may also function in the other direction to map non-Fieldbus process control parameters to corresponding Fieldbus process control parameters.

57 Claims, 4 Drawing Sheets

U.S. PATENT DOCUMENTS

| | | | | |
|---|---|---|---|---|
| 5,764,155 | A | * | 6/1998 | Kertesz et al. ............... 700/295 |
| 5,903,455 | A | * | 5/1999 | Sharpe et al. .................. 700/83 |
| 6,301,527 | B1 | * | 10/2001 | Butland et al. ............. 700/286 |
| 6,434,157 | B1 | * | 8/2002 | Dube' et al. ................ 370/401 |
| 6,618,745 | B2 | * | 9/2003 | Christensen et al. ........ 709/201 |
| 6,631,298 | B1 | * | 10/2003 | Pagnano et al. ............... 700/19 |
| 6,760,782 | B1 | * | 7/2004 | Swales ....................... 709/250 |
| 6,839,790 | B2 | * | 1/2005 | Barros De Almeida et al. .......................... 710/305 |
| 7,181,515 | B2 | * | 2/2007 | Lin et al. ..................... 709/223 |
| 2004/0054829 | A1 | * | 3/2004 | White et al. ................ 710/105 |
| 2004/0070599 | A1 | * | 4/2004 | Mori et al. .................. 345/735 |
| 2004/0153594 | A1 | * | 8/2004 | Rotvold et al. ............. 710/305 |
| 2006/0241913 | A1 | * | 10/2006 | De Groot et al. ........... 702/188 |

OTHER PUBLICATIONS

Smar International; "DFI302 Fieldbus Universal Bridge"; Smar International; available at least by Aug. 14, 2002; pp. 2-35.*

Sena Technologies; "Introduction to MODBUS; Technical Tutorial"; Sena Technologies; Dec. 6, 2002; pp. 1-10.*

Smar International; "SYSTEM302 Enterprise Automation: A Foundation Fieldbus System"; Smar International; available at least by Aug. 14, 2002; pp. 1-36.*

Valve-Wold; "Foundation Fieldbus linked to high-speed Ethernet"; Nov. 11, 2001; available online at <http://www.valve-world.net/projects/news_fullstory.asp?NewsID=1435>.*

Softing; "FG-300 Fieldbus Gateway"; Softing: Nov. 2002; available online at <http://www.softing.com/en/pdf/communications/fieldgate/D_IA_04E_0211_FG-300_Z.pdf>.*

Fieldbus Facts Online; "Discrete I/O in FOUNDATION fieldbus"; Sep. 2002; vol. 3, No. 9; available online at <http://www.fieldbus.org/fieldbusfacts/september2002/fieldbusfactssept02.html>.*

Control Engineering; "Comact Ethernet-to-fieldbus gateway"; Control Engineering; Sep. 1, 2000; available online at <http://www.manufacturing.net/ctl/article/CA211641>.*

Lovashov et al.; "Applicability of Internet Protocols for Fieldbus Access"; IEEE; 4th IEEE International Workshop on Factory Communication Systems, Västerás, Sweden; Aug. 30, 2002; pp. 205-213.*

MKS Instruments, Inc., Wilmington, MA, "CDN067-3 Devicenet Specifications; Revision 1.3," Aug. 4, 1997, Internet URL: http://www.mksinst.com/pdf/dipcdn0673dnspec.pdf, pp. 1, 4-5 and 9-11.

Watlow Electric Manufacturing Co., Winong, MN, "CDN Gateway; Application Note," Mar. 2002, Internet URL: http://www.watlow.com/literature/prodtechinfo/files/controllers/cdne_b.pdf, pp. 3 and 7-10.

Deutschmann Automation GMBH, Bad Camberg, Germany, "User Manual: Universal Fieldbus-Gateway Unigate®," Oct. 26, 2000, Internet URL: http://www.deutschmann.de/English/download/manuals/gateway/uni_an_e.pdf, Sections 13.2-13.3.

Sveda M et al., "Interconnecting Low-Level Fieldbusses," Euromicro 97: New Frontiers of Information Technology., Proceedings of the 23$^{rd}$ Euromicro Conference, Budapest, Hungary, Sep. 1-4, 1997, IEEE Computer Society, Los Alamitos, CA, Sep. 1, 1997, pp. 614-620, ISBN: 0-8186-8129-2.

Smar, "DF1302 Fieldbus Universal Bridge User's Manual," (194 pages) (May 2002).

"System302 Enterprise Automation—Connecting to the Future," SMAR Industrial Automation, Sep. 15, 2003, downloadable at http://www.smar.com/System302/index.asp, Presentations tab, 138 pages.

http://www.smar.com/System302/index.asp, Aug. 22, 2006, 2 pages.

International Search Report, International Application No. PCT/US2005/030765, mailed Mar. 1, 2006.

Written Opinion of the International Searching Authority, mailed Mar. 1, 2006.

"Buses and the DeltaV System," Jan. 2002, Internet URL: http://www.easydeltav.com/pd/wp_busses.pdf#search='buses%20and%20the%20DeltaV%20System'>, pp. 1-8.

* cited by examiner

FIG. 3

| PROFIBUS DP SERVICE ACCESS POINT | Fieldbus Process Control Network 14 | | | | |
|---|---|---|---|---|---|
| | Segment Number | Field Device Number | Function Block Number | Parameter | Value |
| 45001 | 1 | 848-01 | TT-01-1 | Output Status | 28 |
| 45002 | 1 | 848-01 | TT-01-2 | Output Status | 128 |
| 45003 | 1 | 848-01 | TT-01-3 | Output Status | 128 |
| 45004 | 1 | 848-02 | TT-02-1 | Output Status | 128 |
| 45305 | 2 | 848-39 | TT-39-1 | Output Status | 128 |
| 45306 | 2 | 848-39 | TT-39-2 | Output Status | 128 |
| 45307 | 2 | 848-40 | TT-40-1 | Output Status | 128 |
| 45308 | 2 | 848-40 | TT-40-3 | Output Status | 128 |
| 45321 | 3 | 3051-41 | PP-41-1 | Output Status | 128 |
| 45322 | 3 | 3051-42 | PP-42-1 | Output Status | 128 |
| 45323 | 3 | 3051-43 | PP-43-1 | Output Status | 128 |
| 45324 | 3 | 3051-44 | PP-44-1 | Output Status | 128 |
| 47001 | 1 | 848-01 | TT-01-1 | Output Value | |
| 47003 | 1 | 848-01 | TT-01-2 | Output Value | 10.0 |
| 47005 | 1 | 848-01 | TT-01-3 | Output Value | 45.0 |
| 47007 | 1 | 848-02 | TT-02-1 | Output Value | 25.0 |
| 47609 | 2 | 848-39 | TT-39-1 | Output Value | 55.0 |
| 47610 | 2 | 848-39 | TT-39-2 | Output Value | 56.0 |
| 47625 | 2 | 848-40 | TT-40-1 | Output Value | 15.0 |
| 47629 | 2 | 848-40 | TT-40-3 | Output Value | 15.0 |
| 47641 | 3 | 3051-41 | PP-41-1 | Output Value | 300.0 |
| 47643 | 3 | 3051-42 | PP-42-1 | Output Value | 305.0 |
| 47645 | 3 | 3051-43 | PP-43-1 | Output Value | 80.0 |
| 47647 | 3 | 3051-44 | PP-44-1 | Output Value | 82.0 |

INTERFACE MODULE FOR USE WITH A FIELDBUS DEVICE NETWORK AND WITH INTERNET AND NON-INTERNET BASED PROCESS CONTROL NETWORKS

REFERENCE TO RELATED APPLICATION

This application is a continuation-in-part of U.S. patent application Ser. No. 10/354,525, filed Jan. 30, 2003 by Eric D. Rotvold, Donald R. Lattimer, Michael J. Green, Robert J. Karschnia and Marcos A. V. Peluso, which is expressly incorporated by reference herein.

FIELD OF THE INVENTION

The present invention relates generally to process control systems and, more particularly, to an interface module for exchanging data between a Fieldbus device network and Internet and non-Internet based process control networks.

DESCRIPTION OF THE RELATED ART

Process control systems, like those used in chemical, petroleum or other processes, typically include at least one centralized process controller communicatively coupled to at least one host or operator workstation and to one or more field devices via analog and/or digital buses or other communication lines or channels. The field devices, which may be, for example, valves, valve positioners, switches, transmitters (e.g., temperature, pressure and flow rate sensors), etc. perform functions within the process such as opening or closing valves and measuring process parameters. The process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, configuring the process, documenting the process, etc.

In the past decade or so, smart field devices including a microprocessor and a memory have become prevalent in the process control industry. In addition to performing a primary function within the process, smart field devices may store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, Actuator Sensor Interface (hereinafter "AS-Interface" or "ASI"), WORLDFIP®, Device-Net®, CAN, and FOUNDATION™ Fieldbus (hereinafter "Fieldbus") protocols, and have been developed to enable smart field devices made by different manufacturers to be used together within the same process control network. These process control networks may be implemented using Internet-based protocols, such as FOUNDATION™ Fieldbus over High Speed Internet, Modbus TCP, ProfiNet and OPC, and non-Internet based protocols, such as Modbus, Profibus DP, DeviceNet, HART®, CANOpen, and the like.

One such standard communication protocol for smart field devices is the Profibus DP protocol. The Profibus DP protocol defines a message structure that controllers will recognize and use regardless of the types of networks over which they communicate. It establishes a common format for the layout and content of message fields. Profibus DP defines a process for the controllers to request access to other devices, for the controllers and devices to respond to requests, and for error detection and reporting. During communications on a Profibus DP network, the protocol determines how each controller or device will know its device address, recognize a message addressed to it, determine the kind of action to be taken based on a service code contained in the message, and extract any data or other information contained in the message. If a reply is required, the slave device will construct the reply message and send it to the master device using the Profibus DP protocol. The Profibus DP protocol is known in the art and is described in detail in numerous articles, brochures and specifications published, distributed and available from, among others, manufacturers of devices using the Profibus DP protocol. As a result, the details of the Profibus DP communication protocol will not be described in detail except to the extent they relate to the present invention.

Profibus DP employs a master-slave query-response cycle for exchanging information between controllers and field devices. Each device is assigned an address ranging between 0 and 125. One device, the master, initiates transactions, such as queries, set point changes, diagnostics, and the like, by transmitting a message addressed to another device, the slave. Under the Profibus DP protocol, the message transmitted by the master is formatted to include the device address of the slave device, a service code defining the requested action, any data to be sent to the slave device, and error-checking information. The slave device detects and receives the message from the master based on the address in the message, and processes the transaction or service indicated by the service code in the message. After processing the transaction or performing the requested service, the slave transmits a response message constructed using the Profibus DP protocol and containing information confirming the action taken, any data to be returned to the master, and error-checking information. In addition to individual messages, the master may send messages to a defined group of slave devices (multi-cast messages), or may broadcast a message to all connected slaves. The master transmits broadcast and multi-cast messages as global control messages to the slaves using address 127 and, in the case of multi-cast messages, an optional group number for a targeted group of slave devices. While the slaves respond to messages addressed to them individually, the slaves do not respond to broadcast or multi-cast messages from the master device.

Data is exchanged between devices in the Profibus DP network using service access points. Each Profibus DP device has a profile including the specified set of process control parameters associated with device, and each process control parameter used in the Profibus DP network is assigned a corresponding service access point from a range of available service access points. The devices in the Profibus DP network are configured to store and exchange the process control parameters according to their assigned service access points. In order to obtain the value of a process control parameter from a slave device, a master device formats and transmits a request message including the address of the slave device and the service access point for the process control parameter. Upon receiving the request message, the slave device reads the current value for the service access point, and formats and transfers a response message with the service access point and its stored value. Another example of a non-Internet based protocol is the Modbus protocol, which is described more filly in co-pending U.S. patent application Ser. No. 10/354,525 filed on Jan. 30, 2003 from which the present application claims priority and the specification of which is expressly incorporated herein by reference.

Generally speaking, the Fieldbus protocol is an all-digital, serial, two-way communication protocol that provides a standardized physical interface to a two-wire loop or bus that interconnects field devices. The Fieldbus protocol provides, in effect, a local area network for field devices within a process, which enables these field devices to perform process control functions (using function blocks) at locations distributed throughout a process facility and to communicate with one another before and after the performance of these process control functions to implement an overall control strategy. The Fieldbus protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein except to the extent they relate to the present invention.

A Fieldbus process control network may include one or more interconnected Fieldbus segments, with each segment having one or more field devices, linked together via a bus. For communication to occur, one of the devices on each segment of the bus operates as a link active scheduler (LAS) that actively schedules and controls communication on the associated segment of the bus. The LAS for each segment of the bus stores and updates a communication schedule (a link active schedule) containing the times that each function block of each device is scheduled to start periodic communication activity on the bus and the length of time for which this communication activity is to occur. The LAS also controls asynchronous communication activities that may occur when no synchronous communication is taking place on the bus segment. During the time that synchronous communication is not occurring, each field device is allowed, in turn upon receipt of a pass token message from the LAS, to transmit alarm data, view data, etc. in an asynchronous manner.

Under the Fieldbus protocol, field devices are able to communicate with each other over a bus using unique addresses that are assigned to each field device. The field devices are attached to nodes of the bus, and each node has a designated physical address that identifies the field device attached thereto for use in communicating with the other field devices in the process control network. The unique address for the field device is included in the messages published by the device on the bus. The field device or devices to which the messages are published are configured to listen to the bus segment to which it is connected for messages containing the address of the publishing field device. When the subscribing field devices detect messages with the address of the publishing field device, they decode and process the messages as necessary to effect process control.

Field devices are able to publish or transmit data and messages over the bus using one of three types of virtual communication relationships (VCRs) defined in each field device. A client/server VCR is used for queued, unscheduled, user initiated, one-to-one, communications between devices on the bus. A field device may use a client/server VCR when it receives a pass token message from an LAS to send a request message to another device on the bus. The requester is called the "client" and the device that receives the request is called the "server." The server sends a response when it receives a pass token message from the LAS and processes the client's request. The client/server VCR is used, for example, to effect operator initiated requests such as set point changes, tuning parameter access and changes, alarm acknowledgments, and device uploads and downloads.

A report distribution VCR is used for queued, unscheduled, user initiated, one-to-many communications. For example, when a field device with an event or a trend report receives a pass token from an LAS, that field device sends its message to a "group address" defined in the device. Devices that are configured to listen on that VCR will receive the report. The report distribution VCR type is typically used by Fieldbus devices to send alarm notifications to operator consoles.

Finally, a publisher/subscriber VCR type is used for buffered, one-to-many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus when the publisher device receives a compel data message from the LAS or from a subscriber device. The publisher/subscriber relationships are predetermined and are defined and stored within each field device. Like Profibus DP and Fieldbus, other protocols provide communication strategies to allow smart field devices to exchange information and implement process control strategies.

As previously indicated, non-Internet based protocols, such as the Profibus DP, Modbus and Fieldbus protocols, and Internet-based protocols have been in use in process control systems for the last decade or so. As a result, conditions may arise wherein process control networks using the Fieldbus protocol may co-exist with process control networks using other protocols in the same plant or facility. For example, an installation having an incumbent process control system operating under the Profibus DP protocol may convert a portion of the process control network to operate under the Fieldbus protocol in order to implement a particular control strategy or capability that is supportable by the Fieldbus protocol. However, despite the partial conversion, the Profibus DP portion of the process control network may still require information and data from the Fieldbus portion of the process control network. As a further example, a plant or facility with an existing process control network operating under the Profibus DP protocol may be expanded to include additional processes having process control networks operating under the Fieldbus protocol, or vice versa. Moreover, the facility may include other processes having process control networks operating under Internet-based protocols. As with the previous example, it may be necessary to communicate data and information between the Fieldbus network, the Profibus DP network and the Internet-based network. In current implementations, data cannot be communicated between these divergent process control networks. Therefore, a need exists for an interface module that may be connected between process control networks using differing communication protocols to allow information and data from the various networks to be communicated between the devices in the networks.

SUMMARY OF THE INVENTION

An interface module is operatively connected to a Fieldbus process control network and to at least one non-Fieldbus process control network to facilitate the exchange of process control information between the networks. The interface module stores a database in which the process control parameters of the function blocks in the field devices of the Fieldbus process control network are mapped to corresponding process control parameters of the non-Fieldbus process control network. Once the Fieldbus process control parameters are mapped to the non-Fieldbus process control parameters, the interface module is adapted to transmit request messages on the Fieldbus process control network to the Fieldbus field devices for the current values of the process control parameters, receive response messages from the interface module containing the current values of the process control parameters from the Fieldbus field devices, and store the current values of the process control parameters in the service access point database. The interface module may also function in the other direction to map non-Fieldbus process control parameters to corresponding Fieldbus process control parameters.

Field devices in the non-Fieldbus process control network may obtain the values of the Fieldbus process control parameters by transmitting request messages to the interface module for the current values of the non-Fieldbus process control parameters to which the Fieldbus process control parameters have been mapped. Upon receiving the requests, the interface module reads the database entry corresponding to the non-Fieldbus process control parameter to obtain the value of the Fieldbus process control parameter. The interface module formats and transmits a response to the requesting non-Fieldbus field device containing the non-Fieldbus process control parameter and value of the corresponding Fieldbus process control parameter from the database. In order to configure the database to associate the Fieldbus process control parameters with the non-Fieldbus process control parameters, the interface module may include an Internet connection to which a user interface, such as a personal computer, may be connected. Web server software in the interface module and web browser software at the user interface may be used to provide a graphical interface for the service access point database configuration process.

In one aspect, the invention is directed to an interface module for use in a process control system including a Fieldbus process control network having a plurality of Fieldbus field devices and at least a first non-Fieldbus process control network having a plurality of non-Fieldbus field devices. The interface module may operatively connect the Fieldbus process control network to the first non-Fieldbus process control network and may be adapted to facilitate the exchange of process control information between the Fieldbus process control network and the first non-Fieldbus process control network. The interface module may include a Fieldbus I/O module operatively connected to the Fieldbus process control network and adapted to transmit and receive Fieldbus protocol messages on the Fieldbus process control network, a first non-Fieldbus I/O module operatively connected to the first non-Fieldbus process control network and adapted to transmit and receive messages communicated using a protocol other than the Fieldbus protocol on the first non-Fieldbus process control network, and a controller operatively connected to the Fieldbus I/O module and the first non-Fieldbus I/O module, and including a processor and a memory operatively connected to the processor. The controller may be programmed to cause the Fieldbus I/O module to transmit messages to and receive messages from Fieldbus field devices on the Fieldbus process control network, and to cause the first non-Fieldbus I/O module to transmit messages to and receive messages from non-Fieldbus field devices on the first non-Fieldbus process control network.

In another aspect, the invention is directed to a method of exchanging process control information between a Fieldbus process control network having a plurality of Fieldbus field devices and a non-Fieldbus process control network having a plurality of non-Fieldbus field devices. The method may include operatively connecting an interface module to the Fieldbus process control network and to the non-Fieldbus process control network. The interface module may be configured to transmit and receive Fieldbus protocol messages on the Fieldbus process control network and to transmit and receive non-Fieldbus protocol messages on the non-Fieldbus process control network. The method may also include storing in the interface module a database wherein at least one process control parameter of one of the process control networks is associated with a process control parameter of the other of the process control networks, causing the interface module to request a current value of the at least one process control parameter from a corresponding one of the field devices in the one of the process control networks, and storing the current value of the at least one process control parameter of the one of the process control networks in the database with the associated process control parameter of the other of the process control networks. The method may further include causing the interface module to transmit a response message to one of the field devices of the other of the process control networks with the current value of the at least one process control parameter of the one of the process control networks and the process control parameter of the other of the process control networks in response to receiving a request message from the one of the field devices of the other of the process control networks at the interface module for the current value of the associated process control parameter of the other of the process control networks.

In a further aspect of the invention, an interface module is provided for use in a process control system including a Fieldbus process control network having a plurality of Fieldbus field devices and a Profibus DP process control network having a plurality of Profibus DP field devices. The interface module may operatively connect the Fieldbus process control network to the Profibus DP process control network and may be adapted to facilitate the exchange of process control information between the Fieldbus process control network and the Profibus DP process control network. The interface module may include a Fieldbus I/O module operatively connected to the Fieldbus process control network and adapted to transmit and receive Fieldbus protocol messages on the Fieldbus process control network, a Profibus DP I/O module operatively connected to the Profibus DP process control network and adapted to transmit and receive Profibus DP protocol messages on the Profibus DP process control network, and a controller operatively connected to the Fieldbus I/O module and the Profibus DP I/O module, with the controller including a processor and a memory operatively connected to the processor.

The controller of the interface module may be programmed to store in the memory a service access point database wherein at least one Fieldbus process control parameter of the Fieldbus process control network is associated with a Profibus DP service access point of the Profibus DP process control network, and be programmed to cause the Fieldbus I/O module to request a current value of the at least one Fieldbus process control parameter from a corresponding one of the Fieldbus field devices. The controller may further be programmed to store the current value of the at least one Fieldbus process control parameter in the service access point database with the associated Profibus DP service access point, and may be programmed to cause the Profibus DP I/O module to transmit a response message to one of the Profibus DP field devices with the current value of the at least one Fieldbus process control parameter and the associated Profibus DP service access point in response to receiving a request message from the one of the Profibus DP field devices at the Profibus DP I/O module for the current value of the associated Profibus DP service access point.

According to another aspect of the invention, a process control system includes a Fieldbus process control network having a plurality of Fieldbus field devices, a Profibus DP process control network having a plurality of Profibus DP field devices, and an interface module operatively connecting the Fieldbus process control network to the Profibus DP process control network which may be adapted to facilitate the exchange of process control information between the Fieldbus process control network and the Profibus DP process control network. The interface module may include a Fieldbus I/O module operatively connected to the Fieldbus process control network and adapted to transmit and receive Fieldbus protocol messages on the Fieldbus process control network, a Profibus DP I/O module operatively connected to the Profibus DP process control network and adapted to transmit and receive Profibus DP protocol messages on the Profibus DP process control network, and a controller operatively connected to the Fieldbus I/O module and the Profibus DP I/O module which may include a processor and a memory operatively connected to the processor.

The controller may be programmed to store in the memory a service access point database wherein at least one Fieldbus process control parameter of the Fieldbus process control network is associated with a Profibus DP service access point of the Profibus DP process control network, and to cause the Fieldbus I/O module to request a current value of the at least one Fieldbus process control parameter from a corresponding one of the Fieldbus field devices. The controller may further be programmed to store the current value of the at least one Fieldbus process control parameter in the service access point database with the associated Profibus DP service access point, and to cause the Profibus DP I/O module to transmit a response message to one of the Profibus DP field devices with the current value of the at least one Fieldbus process control parameter and the associated Profibus DP service access point in response to receiving a request message from the one of the Profibus DP field devices at the Profibus DP I/O module for the current value of the associated Profibus DP service access point.

According to a still further aspect of the invention, a method of exchanging process control information between a Fieldbus process control network having a plurality of Fieldbus field devices and a Profibus DP process control network having a plurality of Profibus DP field devices may include the steps of operatively coupling an interface module to the Fieldbus process control network and to the Profibus DP process control network, the interface module being adapted to transmit and receive Fieldbus protocol messages on the Fieldbus process control network and to transmit and receive Profibus DP protocol messages on the Profibus DP process control network, and storing in the interface module a service access point database wherein at least one Fieldbus process control parameter of the Fieldbus process control network is associated with a Profibus DP service access point of the Profibus DP process control network. The method may further include causing the interface module to request a current value of the at least one Fieldbus process control parameter from a corresponding one of the Fieldbus field devices, and storing the current value of the at least one Fieldbus process control parameter in the service access point database with the associated Profibus DP service access point. Still further, the method may include the step of causing the interface module to transmit a response message to one of the Profibus DP field devices with the current value of the at least one Fieldbus process control parameter and the associated Profibus DP service access point in response to receiving a request message from the one of the Profibus DP field devices at the interface module for the current value of the associated Profibus DP service access point.

The features and advantages of the invention will be apparent to those of ordinary skill in the art in view of the description of the embodiments, which is made with reference to the drawings, a brief description of which is provided below.

BRIEF DESCRIPTION OF THE DRAWINGS

FIG. 3 is a portion of service access point database mapping Fieldbus process control parameters to Profibus DP service access points.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of a patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this provisional patent application, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
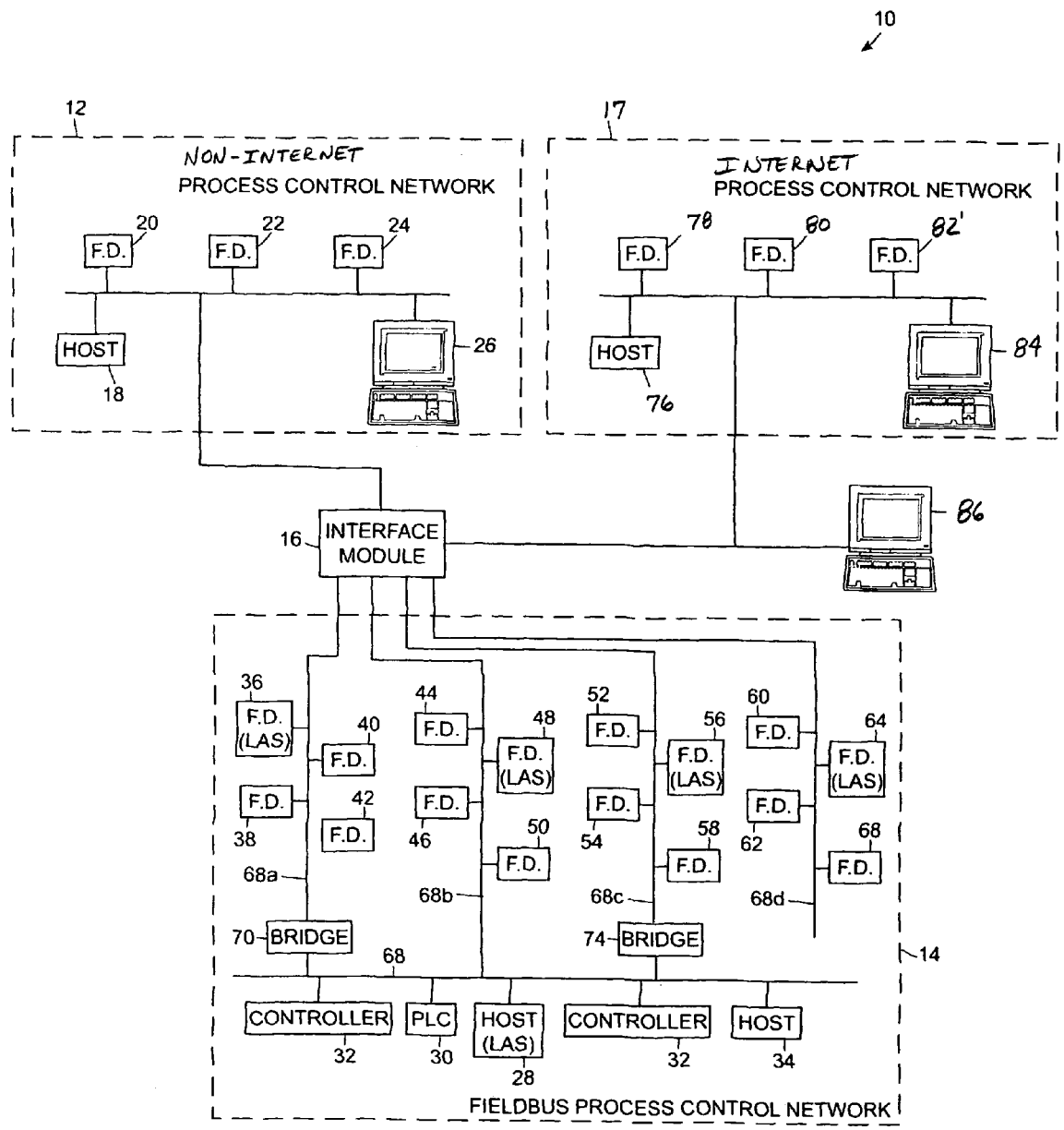
FIG. 1 is a block diagram of a process control system having a Profibus DP process control network connected to a Fieldbus process control network by an interface module.

Referring now to FIG. 1, a process control system 10 may include a non-Internet based protocol process control network 12 connected to a Fieldbus process control network 14, and to an Internet-based protocol process control network 17 by an interface module 16. The non-Internet based process control network 12 may include a host device or controller 18 connected to a plurality of field devices 20-24 and one or more user interfaces 26. In this system, the host 18 may be used to implement process control in the non-Internet based process control network 12 and serve as a master device initiating transactions that are received by the devices 20-24 and user interface 26, depending on the requirements of the process control network and non-Internet based protocol under which the network 12 may be operating. The devices 20-24 and user interface 26 may respond by supplying requested data to the host 18, or by taking action requested by the query.

The Fieldbus process control network 14 may include a host or controller 28 connected to a number of other devices such as a program logic controller (PLC) 30, a number of controllers 32, another host device 34 and a set of field devices 36-66 via a two-wire Fieldbus loop or bus 68. The Fieldbus process control network 14 may include different sections or segments, 68a, 68b, 68c and 68d. Some segments, such as segment 68b, may be connected directly to the bus 68, while other segments, such as segments 68a and 68c, may be connected to the bus 68 by bridge devices 70, 74. Still further, the Fieldbus process control network 14 may include segments, such as segment 68d, connected to the Fieldbus process control network 14 by the interface module 16. Each of the sections 68a, 68b, 68c and 68d interconnects a subset of the devices to enable communications between the devices in a manner previously described. For communication to occur, one of the devices on each segment of the bus 68 operates as the link active scheduler (for example, controller 28 and devices 36, 48, 56 and 64) that actively schedules and controls communication on the associated segment of the bus 68.

The non-Internet based network 12 is connected to the Fieldbus network 14 by the interface module 16. The interface module 16 is connected to the non-Internet based network 12 via an input/output (I/O) port configured to be protocol-compatible with the non-Internet based process control network 12, and to nodes on one or more of the segments 68a, 68b, 68c and 68d of the Fieldbus network 14 via Fieldbus-compatible I/O ports. To facilitate communications to and from the interface module 16 in the non-Internet based network 12, the interface module 16 may be assigned a device address within the protocol of the network 12, and the interface module 16 may be configured so that the devices 18-26 can format and transmit messages for the interface module 16, and the interface module 16 can receive, identify and process the messages, perform the requested action, and transmit response messages to the devices 18-26 via the protocol-compatible I/O port using the protocol of the network 12 in the same manner as other devices 18-26 of the network 12.

The interface module 16 may also be configured as a link master device of the Fieldbus process control network 14 so that the interface module 16 may function as the link active scheduler for one or more of the segments of the Fieldbus process control network 14 attached thereto. Moreover, as previously discussed, the interface module 16 may also function as a bridge device to facilitate communications between a segment, such as segment 68d, that may not be connected directly to the bus 68 and/or the other segments 68a, 68b and 68c of the Fieldbus process control network 14.

As with the non-Internet based network 12, the interface module 16 is capable of communicating on the segments 68a, 68b, 68c and 68d of the bus 68 to which it is connected via the Fieldbus I/O ports. The interface module 16 is assigned a Fieldbus device address so that the interface module 16 is recognized by the devices 36-66 on the segments 68a, 68b, 68c and 68d to which it is attached. The link master schedules in the LAS devices 36, 48, 56 and 64 are configured so that pass token messages will be transmitted to the interface module 16 during the asynchronous periods of the link master schedules. The VCRs in the devices 36-66 and at the interface module 16 are configured so that the interface module 16 may transmit messages to the field devices 36-66 requesting the values of the process control parameters for which the interface module 16 is configured to store, and the field devices 36-66 may transmit response messages to the interface module 16 containing the current values of the requested Fieldbus process control parameters.

The Internet-based protocol process control network 17 may include one or more host devices or controllers 76 connected to a plurality of field devices 78-82 and one or more user interfaces 84 that may communicate using the Internet-based protocol under which the process control network 17 operates. In the process control network 17, the host device(s) 76 and field devices 78-82 may be configured to implement a process control strategy using the Internet-based protocol associated with the process control network 17. The Internet-based process control network may also be connected to the non-Internet based process control network 12 and/or the Fieldbus process control network 14 by the interface module 16. The interface module 16 is connected to the Internet-based process control network 17 via an Internet-compatible input/output (I/O) port, which may allow the devices 76-84 of the network 17 to communicate with the interface module 16, and to exchange information with the other process control networks 12, 14 in a manner described more fully below. As with the other networks 12, 14, the interface module 16 may be assigned a device address within the protocol of the network 17 to facilitate communications to and from the interface module 16 and the Internet-based network 17. Configured in this way, the interface module 16 can receive, identify and process the messages, perform the requested action, and transmit response messages to the devices 76-84 via the Internet-compatible I/O port using the protocol of the network 17 in the same manner as other devices 76-84 of the network 17.

In order to communicate with the Internet-based network 17, and to configure the interface module 16 and display data compiled therein, the interface module 16 may be programmed with web server software. Configuration of the interface module 16 may be accomplished over the Internet-compatible I/O port using the standard web browser software available in any personal computer, such as user interface 86. Web pages provided by the web server software of the interface module 16 to the web browser software of the user interface 86 allow a process monitor or operator to map process control parameters of the devices 36-66 of the Fieldbus network 14 to corresponding parameters for use in the Internet and non-Internet based networks. The web pages may also allow the monitor or operator to view the current values of the process control parameters from the interfaced networks that may be mapped to corresponding parameters in one or more of the other interfaced networks and stored in the interface module 16.

Figure 2:
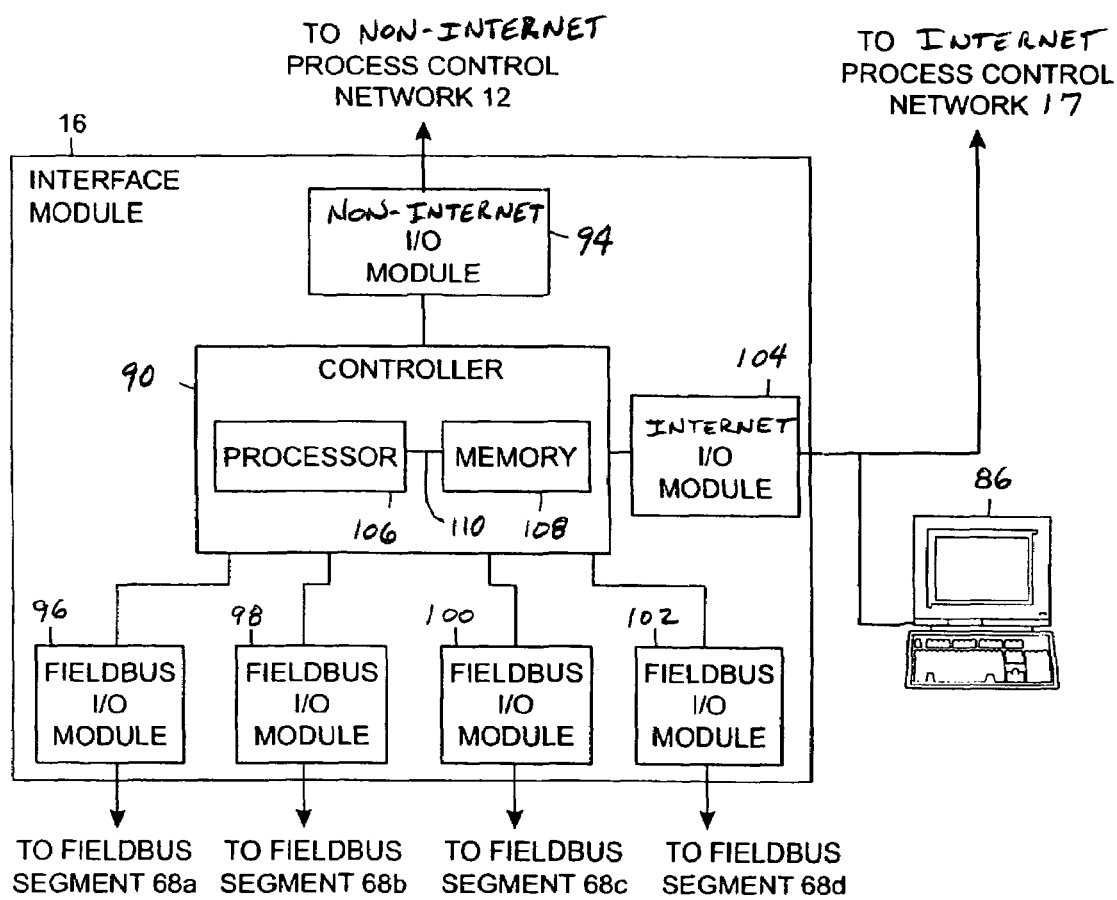
FIG. 2 is a functional block diagram of the interface module of FIG. 1.

Referring now to FIG. 2, the interface module 16 may include a controller 90 connected to memory 92, a non-Internet based protocol-compatible I/O module 94, Fieldbus I/O modules 96-102, and Internet-compatible I/O module 104. The controller 90 may be embodied in hardware that is commercially available, such as in a 16 or 32 bit, 16 megahertz (MHZ) 80C960SA microcontroller, which is commercially available from Intel, or may be embodied in any other suitable microcontroller. The controller 90 may include a processor 106 that is communicatively coupled to a memory 108 via a bus 110. The memory 108 of the controller 90 may be random access memory (RAM), read-only memory (ROM), such as a semi-conductor ROM, or any suitable combination thereof. Alternatively or additionally, the memory 108 may include any one of, or any suitable combination of, an electrically erasable programmable read-only memory (EEPROM), a one-time programmable electrically programmable read-only memory (OTP EPROM), a static random access memory (SRAM), flash or any other suitable memory element may be externally connected to the processor 106 of the controller 90. Furthermore, the memory(ies) may be embodied in other computer-readable media such as optical media, e.g., CDs, rewritable CDs, DVDs and the like, or magnetic media, e.g., floppy discs, hard drives, zip discs and the like.

The non-Internet I/O module 94 connects the controller 90 to the non-Internet based protocol network 12 using, for example, an RS485 serial port, a port for an Ethernet connection, such as a standard RJ 45/10/100bt connector, or any other suitable connection to the particular non-Internet based protocol network known in the art. The non-Internet I/O module 94 is configured to communicate with the host 18, field devices 20-24 and user interface 26 using the corresponding non-Internet based protocol. For example, where the non-Internet based network 12 is a Profibus DP network, the non-Internet I/O module 94 may be configured to receive messages transmitted on the Profibus DP network 12, and to detect messages transmitted by the host 18 or other master devices containing the Profibus DP address assigned to the interface module 16. Once detected, the non-Internet I/O module 94 may be capable of extracting and, if necessary, reformatting the data contained in the message and transferring the information to the controller 90 for executing the service request from the host 18. The non-Internet I/O module 94 may be further configured to receive data from the controller 90, which may be provided in response to a service request from the host 18, formatting an appropriate Profibus DP protocol message, and transmitting the message through the non-Internet I/O module 94 over the Profibus DP network 12.

Those skilled in the art will understand that the non-Internet I/O module 94 may be implemented in any appropriate manner to facilitate communications between the devices of the non-Internet based network 12 and the interface module 16 using the corresponding protocol. For example, the non-Internet I/O module 94 may be implemented as software within the interface module 16 that may be programmed to communicate between the network 12 and interface module 16 using the non-Internet protocol implemented in the network 12. In such an implementation, the I/O module 94 may be programmed or reprogrammed at the interface module 16 via a download of programming instructions from an external storage device. Alternatively, the I/O module 94 may be reprogrammed and reconfigured by downloading code from the user interface 86 connected to the interface module 16 via the Internet. Still further, the interface module 16 may be preprogrammed with the software for multiple non-Internet based protocols that may be used in process control networks to which the interface module 16 may be connected. Once the protocol of the process control network 12 to which the interface module 16 is to be connected is identified, the interface module 16 may be configured to execute the software for the particular one of the available protocols to enable the non-Internet I/O module 94 to communicate with the devices 18-26 of the process control network 12 using the appropriate protocol. As a further alternative, the I/O module 94 may be modular such that the physical module for one non-Internet protocol may be disconnected and removed from the interface module 16 and replaced with another physical module configured to communicate using the appropriate protocol for the process control network 12 to which the interface module 16 is to be connected.

In a similar manner as the non-Internet I/O module 94, the Fieldbus I/O modules 96-102 connect the controller 90 to the Fieldbus segments 68a, 68b, 68c and 68d using, for example, H1 I/O cards, and facilitate communications between the controller 90 and the Fieldbus field devices 36-66. One or more of the Fieldbus I/O modules 96-102 are attached to nodes of the segments 68a, 68b, 68c and 68d, respectively, and the interface module 16 is assigned a Fieldbus address to be used for communicating with the field devices 36-66 connected to the segment 68a, 68b, 68c, and 68d. The link active schedules are configured so that pass token messages for the interface module 16 are transmitted by the LAS field devices 36, 48, 56 and 64 during the asynchronous communications periods of the schedules. Fieldbus I/O modules 96-102 detect the pass token messages for the interface module 16, and any other messages for the interface module 16 transmitted on the segments 68a, 68b, 68c and 68d, and transmit the information in the messages to the controller 90 for processing. When the interface module 16 communicates with the field devices 36-66 of the Fieldbus network 14, controller 90 causes the Fieldbus I/O modules 96-102 to format Fieldbus protocol messages, and to transmit the messages on the appropriate Fieldbus segment 68a, 68b, 68c or 68d.

The Internet I/O module 104 may connect the interface module 16 to an Internet-based process control network, such as process control network 17, and/or to a user interface 86. The interface module 16 may be programmed with standard web server software so that a computer with a web browser, such as the user interface 86, connected thereto may be used to configure the interface module 16 and to view process control information stored therein. An Internet I/O module 104 is connected to the controller 90 and may include a port for an Ethernet connection, such as, for example, a standard RJ 45/10/100bT connector. Alternatively, the Internet I/O module 104 may include an appropriate port for any other type of Internet connection, and may even by configured for wireless communications capabilities for communicating with the Internet-based process control network 17 and/or the user interface 86. Depending on the particular implementation of the interface module 16, the Internet connection may be used to connect the interface module 16 directly to the user interface 86 or, alternatively, to a local area network wherein multiple networked devices with web browser software may be provided with access to the information contained in the interface module 16. Moreover, the user interface 86 may be a device within the Internet-based process control network 17. Similar as for the non-Internet I/O module 94, the interface module 16 may be programmed or reprogrammed to cause the Internet I/O module 104 to communication with the Internet process control network 17 using the associated Internet-based communications protocol.

In some implementations, the interface module 16 is configured to obtain and store process control information from the Fieldbus process control network 14, and to provide the stored Fieldbus process control information to the process control networks 12, 17 upon receiving requests from the devices of the process control networks 12, 17. In order to allow devices in the process control networks 12, 17 to request the values of process control parameters used in the Fieldbus network 14, the process control parameters used in the Fieldbus network 14 may be mapped to corresponding parameters or data structures in the process control networks 12, 17, with the values of the Fieldbus process control parameters being stored at the interface module 16 in a database or databases in memory 108. Once the Fieldbus process control parameters are mapped to data structures in the process control networks 12, 17, the devices of the process control networks 12, 17 may be configured to transmit messages to the interface module 16 using the corresponding communication protocol and requesting the values of the data structures to which the Fieldbus process control parameters are mapped. Upon receiving the request messages at the interface module 16, the processor 106 of the controller 90 looks up values stored in the database in memory 108 corresponding to the data structure in the request messages, and causes the corresponding I/O module 94, 104 to format and transmit protocol-specific response messages with the data structure and corresponding Fieldbus process control parameter values. The requesting devices receive and process the response messages in the same manner as any response message transmitted by a device of the corresponding process control network 12, 17.

As previously discussed, Fieldbus process control parameters are mapped to corresponding data structures for the process control networks 12, 17 in databases stored in the memory 108 of the interface module 16. FIG. 3 illustrates one example of a database 120 that may be constructed at the interface module 16 and stored in the memory 108 of the controller 90 mapping Fieldbus process control parameters to Profibus DP service access points. In this example, the non-Internet based process control network 12 may be a Profibus DP process control network as known in the art. For each Fieldbus process control parameter that is mapped to a Profibus DP service access point 122, the service access point database 120 may include a segment identifier 124, a device identifier 126, a function block identifier 128 and a parameter identifier 130, along with a current value 132 of the Fieldbus process control parameter. The example of FIG. 3 illustrates one implementation of the interface module 16 in accordance with the invention wherein the master devices of the Profibus DP process control network 12, such as the host 18, may be able to obtain, via the interface module 16, the output value and the output status of some or all of the function blocks of the Fieldbus process control network 14. In the service access point database 120 of FIG. 3, service access points in the range of 45,001-45,999 may be mapped to store the current output status of various Fieldbus function blocks, and service access points in the range of 47,001-47,999 may be mapped to store the output values of the various Fieldbus function blocks. For example, in the database 120 of FIG. 3, the output status of a thermal transducer TT-01-1 of device 848-01 on segment 1 may be mapped to Profibus DP service access point 45,001, while the output value of the thermal transducer TT-01-1 may be mapped to Profibus DP service access point 47,001. Similarly, the output status of a pressure transducer PP-44-1 of device 3051-44 on segment 3 may be mapped to Profibus DP service access point 45,324, while the output value of the pressure transducer PP-44-1 may be mapped to service access point 47,647. Once the Fieldbus process control parameters are mapped to the Profibus DP service access points, the master devices in the Profibus DP network 12 may request the current values of Fieldbus process control parameters from the interface module 16 using the corresponding service access point 122 in the manner described more fully herein.

While the service access point database 100 illustrated herein maps output values and output statuses of the function blocks to Profibus DP service access points, it will be apparent to those skilled in the art that any process control parameters used by the Fieldbus devices of a Fieldbus process control network may be mapped to Profibus DP service access points in a service access point database. It will be appreciated that the Fieldbus process control parameters mapped to the Profibus DP service access points may be determined by the requirements of process control system in which the interface module 16 is implemented. Moreover, parameters of the Fieldbus process control network 14 may be mapped to corresponding date structures for process control networks 12, 17 connected to the I/O modules 94, 104. Also, the interface module 16 may map process control parameters for the process control networks 12, 17 to Fieldbus process control parameters, or parameters for non-Fieldbus process control networks may be mapped to parameters for other non-Fieldbus process control networks connected to the interface module 16, in order to facilitate the exchange of information as necessary to integrate the process control networks connected by the interface module 16.

Returning to the Profibus DP example, in order to establish the service access point database 120, the interface module 16 must first identify the function blocks and process control parameters existing in the field devices 36-66 of the Fieldbus network 14. As previously discussed, once the interface module 16 is connected to one or more of the segments 68a, 68b, 68c and 68d of the Fieldbus network 14 via the Fieldbus I/O modules 96-102, the link active schedules of the corresponding LAS field devices 36, 48, 56 and 64 are configured to transmit pass token messages for the interface module 16 during the asynchronous period of the schedule. When the interface module 16 receives a pass token message on one of the segments 68a, 68b, 68c or 68d, the interface module 16 transmits messages on the segment to poll the corresponding field devices for information relating to their existence, the function blocks contained therein, and the process control parameters used by the function blocks. For example, when the interface module 16 is connected to segment 68a, and LAS field device 36 transmits a pass token message to the Fieldbus address of the interface module 16, the Fieldbus I/O module 96 detects the past token message and communicates to the controller 90 that the interface module 16 may transmit messages on segment 68a. The controller 90 causes the Fieldbus I/O module 96 to transmit messages on the segment 68a polling the field devices 36-42 for information pertaining to the function blocks and process control parameters contained therein. The field devices 36-42 respond by transmitting messages to the interface module 16 containing the requested information. The response messages are detected by the Fieldbus I/O module 96, which relays the information to the controller 90. The processor 106 of the controller 90 causes the information from the field devices 36-42 to be stored in memory 108 for use in constructing the service access point database 120. Similar polling of the field devices 44-66 of the segment 68b, 68c and 68d, if any, to which the interface module 16 is attached will be performed by the controller 90.

Once information relating to the process control parameters of the Fieldbus network 14 has been compiled by the interface module 16, the process control parameters may be mapped to Profibus DP service access points using the web browser of the user interface 86. Information for the available process control parameters stored in the memory 108 may be transmitted from the controller 80 through the Internet I/O module 104 to the to user interface 86 upon receiving a service request from the user interface 86. Once displayed, the web pages provided by the web server software of the controller 90 allow the user to view the available process control parameters and to map the process control parameters to Profibus DP service access points for use by the Profibus DP network 12. As service access points are assigned to the process control parameters, the information may be transmitted from the user interface 86 to the interface module 16 and, after the information is received at the Internet I/O module 104, the processor 106 of the controller 90 may cause the service access points to be stored in the service access point database 120 in entries corresponding to the associated process control parameters.

In an alternative embodiment, the Fieldbus process control parameters may be mapped to the Profibus DP service access points at the user interface 86 using software other than a web browser. The mapping may be performed using commercially available software applications such as, for example, the Microsoft® Excel spreadsheet program, or custom developed software applications. The software application may issue a request for information for the available process control parameters stored in the memory 108 via the Ethernet connection between the user interface 86 and the interface module 16. The processor 106 of the controller 90 may respond by retrieving the requested information stored in the memory 108 and causing the Internet I/O module 104 to transmit the retrieved information to the user interface 86 via the Internet connection. Once the information is received by the user interface 86 and displayed by the software application, the software application allows the user to view the information relating to the available process control parameters, and to manipulate the information to map the process control parameters to Profibus DP service access points for use by the Profibus DP network 12. As service access points are assigned to the process control parameters using the software application, the updated information may be transmitted from the user interface 86 to the interface module 16 and, after the information is received at the Internet I/O module 104, the processor 106 of the controller 90 may cause the service access points to be stored in the service access point database 120 in entries corresponding to the associated process control parameters.

In addition to an operator manually mapping the Profibus DP service access points to the Fieldbus process control parameters using the web browser at the user interface 86, the interface module 16 may include an automatic mapping mode whereby the controller 90 of the interface module 16 automatically assigns service access points to the process control variables at the field devices 36-66. The automatic mapping may assign service access points randomly or sequentially without regard to the type of parameter being mapped or, alternatively, pre-determined ranges of service access points may be designated for various types of parameters that may be used in the Fieldbus network 14.

Once the process control parameters of the Fieldbus network 14 are mapped to the service access points of the Profibus DP network 12, the host 18 and other master devices are configured to issue service requests to the interface module 16 for the values of Profibus DP service access points to which the process control parameters of the Fieldbus network 14 have been mapped. The configuration of the Profibus DP devices may be performed manually by an operator at a particular Profibus DP master device. Alternatively, the configuration process may be semi-automated by having the processor 106 of the controller 90 cause the non-Internet I/O module 94 to transmit messages to the master devices of the Profibus DP network 12 that contain the service access points that have been mapped to Fieldbus process control parameters. The data contained in these messages may be used by the operator to configure the Profibus DP master devices to issue service request messages to the interface module 16 to retrieve the values associated with the mapped service access points.

The service request messages issued by the Profibus DP master devices include the Profibus DP device address for the interface module 16, a service code requesting the interface module 16 to read the value of a service access point or service access points, and the service access point or numbers to be read by the interface module 16. The request messages are received at the non-Internet I/O module 94, which decodes the request message and communicates the requests to the controller 90. Upon receiving the request, the processor 106 of the controller 90 reads the service access point database 120 stored in the memory 108 to retrieve the values of the process control parameters corresponding to the service access point or numbers requested by the Profibus DP master devices. Once the value or values have been retrieved, the processor 106 causes the non-Internet I/O module 94 to format and transmit a Profibus DP response message or messages containing the values stored in the service access point database 120 to the requesting master device or devices.

In order to insure that the service access point database 120 includes current values of the Fieldbus process control parameters stored therein, the processor 106 of the controller 90 may cause the Fieldbus I/O modules 96-102 to transmit Fieldbus request messages to the field devices 36-66. Upon receiving pass token messages on the corresponding segment 68a, 68b, 68c and 68d, the Fieldbus I/O modules 96-102 may transmit messages to each of the field devices 36-66 for which at least one process control parameter has been mapped to a Profibus DP service access point. These messages may be transmitted each time a pass token message is received, or may be transmitted less frequently depending on the type of process control parameter or field device, or on the message transmission volume limitations of the Fieldbus network 14. Alternatively, upon receiving a request from a Profibus DP master device for the current value of a Profibus DP service access point, the controller 90 may be configured to cause the corresponding one of the Fieldbus I/O modules 96-102 to transmit a request to the appropriate one of the field devices 36-66 for the current value of the process control parameter. Once the one of the field devices 36-66 responds with the requested process control parameter value, the processor 106 may update the service access point database 120 with the new value and cause the non-Internet I/O module 94 to transmit the appropriate response message to the requesting Profibus DP master device.

As previously stated, the illustrated Fieldbus-to-Profibus DP mapping is exemplary only. The interface module 16 may further be configured to map service access points of the Profibus DP network 12 to Fieldbus parameters of the Fieldbus network 14 such that the interface module 16 may store values of the service access points from the Profibus DP devices and transmit those values in response to requests from the Fieldbus devices. As another example, a ModBus TCP network may be connected to the interface module 16 at the Internet I/O module 104, with parameters of the Fieldbus network mapped to ModBus TCP data structures and vice versa and, if desired, data structures of the ModBus TCP network mapped to data structures of a non-Internet network connected to the non-Internet I/O module 94 or another Internet-based network connected to the Internet I/O module 104. Still further, the interface module 16 may be configured with additional I/O modules 84-104 to facilitate connection and integration of a desired number of process control networks 12, 14, 17.

In order to ensure a substantially constant connection between the process control networks connected by the interface module 16, the interface module 16 and the connection provided thereby may be configured with redundant systems in addition to any redundancy mechanisms implemented in within the connected process control networks. In one embodiment, multiple interface modules 16 may be connected between two or more process control networks in the same configuration such that each interface module 16 may be capable of receiving messages and responding on the process control networks. Moreover, the interface modules 16 may be connected to the user interface 86 such that each of the interface modules 16 may be configured by the user interface 86 in the manner discussed above. The user interface 86 may be configured to configure each of the interface modules 16 so that each of the interface modules 16 is prepared to operate to communicate information between the process control networks. In operation, one of the interface modules 16 may be active at a given time to respond to requests from the field devices of the process control networks, while the remaining interface module(s) 16 may be set to a standby mode wherein the interface module(s) 16 receive information from the field devices and update the information stored in the database(s) in order to remain synchronized with the active interface module 16. Mode control for the interface modules 16 may be effected via a connection between the interface modules 16, via the user interface 86, or via another common connection between interface modules 16 such that the status of the interface modules 16 may be monitored, and the operational mode of the interface modules 16 as active or standby may be adjusted, either manually or automatically based on changes in the status of the interface modules 16 so that an active connection may be maintained between the connected process control networks.

Figure 4:
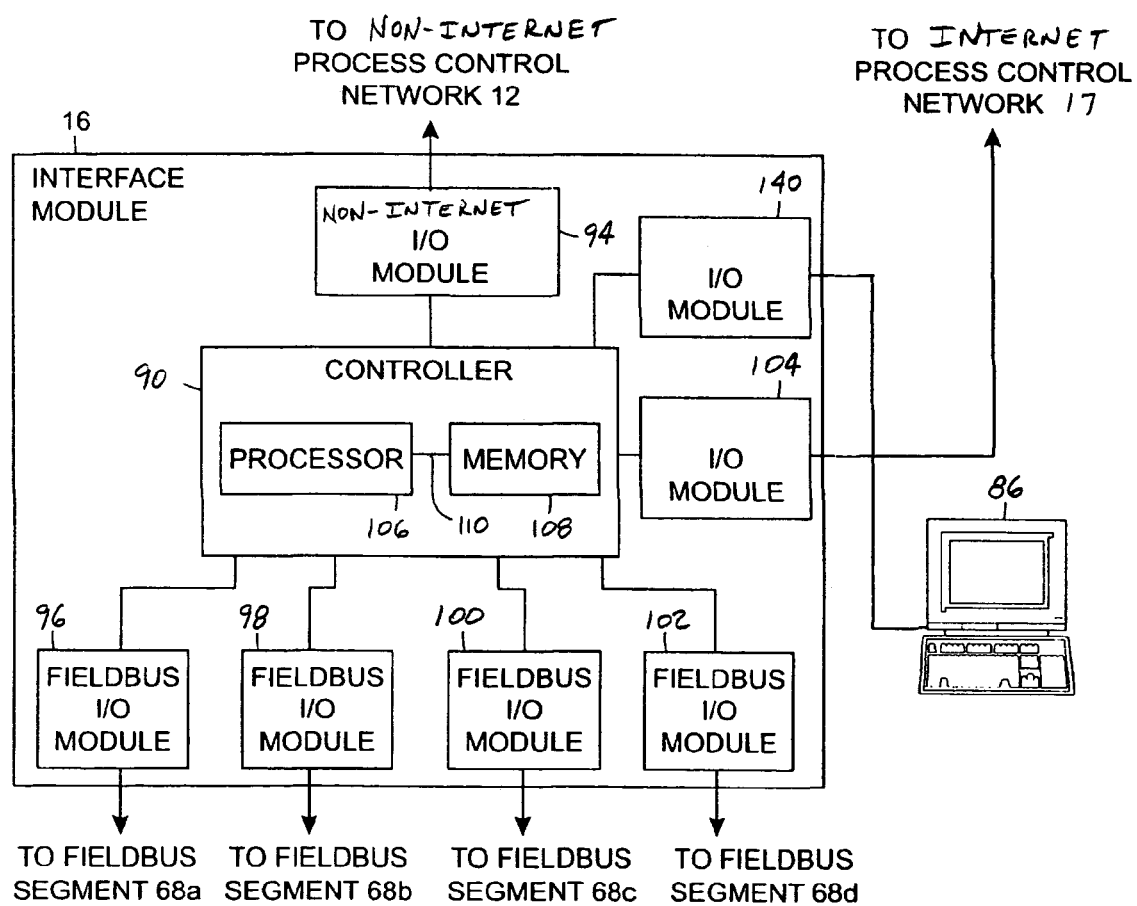
FIG. 4 is a functional block diagram of an alternative embodiment of the interface module of FIG. 1.

As a further alternative, redundancy may be built into the interface modules 16 themselves by providing either multiple I/O modules 94, 104, or multiple input ports for the I/O modules 94, 104 so that a constant connection of the interface module 16 to a given process control network may be maintained. FIG. 4 illustrates an embodiment of the interface module 16 wherein a second Internet I/O module 140 is provided, at least in part, to provide redundancy within the interface module 16. The Internet I/O module 140 may be similar to the Internet I/O module 104, and may be connected to the controller 90 and include a communications port or wireless communications capability for connecting the Internet I/O module 140 to the Internet-based process control network 17 and/or the user interface 86. In the illustrated embodiment, the Internet I/O modules 104, 140 may be connected to the Internet-based process control network 17 to facilitate communications between the interface module 16 and the process control network 17 and user interface 86. At a given time, one of the Internet I/O modules 104, 140 may be designated by the controller 90 as the active module for communications with the Internet process control network 17 and the user interface 86, while the other of the Internet I/O modules 104, 140 may be designated by the controller 90 as the standby module that is available in the event communications through the active module are disrupted, such as in the event of a software failure or loss of connection to the process control network 17. The controller 90 may be configured to detect such communication disruptions and to place the standby module into active status for communications with the process control network 17, and to disable the active module from service so that the communication disruption may be remedied. Additionally, the controller 90 may transmit a message regarding the status of the disabled I/O module 104, 140 to an appropriate device in one of the connected process control networks 12, 14, 17 for notifying a system operator of the condition of the interface module 16. While the redundancy illustrated and described herein relates to the Internet I/O modules 104, 140, those skilled in the art will understand that similar redundancy strategies may be implemented with any of the I/O modules of the interface module 16 to ensure constant communication links with any process control networks 12, 14, 17 connected thereto.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. An interface module for use in a process control system including a Fieldbus process control network having a plurality of Fieldbus field devices and a first non-Fieldbus process control network having a plurality of non-Fieldbus field devices, the interface module operatively connecting the Fieldbus process control network to the first non-Fieldbus process control network and being adapted to facilitate the exchange of process control information between the Fieldbus process control network and the first non-Fieldbus process control network, the interface module comprising:

a Fieldbus I/O module operatively connected to the Fieldbus process control network and configured to transmit and receive Fieldbus protocol messages on the Fieldbus process control network;

a first non-Fieldbus I/O module operatively connected to the first non-Fieldbus process control network and being adapted to transmit and receive messages communicated using a protocol other than the Fieldbus protocol on the first non-Fieldbus process control network; and a controller operatively connected to the Fieldbus I/O module and the first non-Fieldbus I/O module, the controller comprising a processor and a memory operatively connected to the processor, the controller being programmed to store in the memory table containing information for Fieldbus process control parameters of the Fieldbus process control network that are mapped to corresponding process control parameters of the non-Fieldbus process control network, wherein the table includes a record for each Fieldbus process control parameter mapped to a non-Fieldbus process control parameter, and wherein each record in the table includes information identifying the Fieldbus process control parameter, a value of the Fieldbus process control parameter, and an identifier for the non-Fieldbus process control parameter to which the Fielbus control parameter is mapped, the controller being programmed to cause the Fieldbus I/O module to request current values of the Fieldbus process control parameters having records in the table from the corresponding Fieldbus field devices, the controller being programmed to store the current values of the Fielbus process control parameters in the table with the identifiers for the corresponding process control parameters of the non-Fieldbus process control network, and the controller being programmed to cause the first non-Fieldbus I/O module to transmit response messages to the non-Fieldbus field devices with the current values of the Fieldbus process control parameters stored in the table and the identifiers for the corresponding non-Fieldbus process control parameters in response to receiving request messages from the non-Fieldbus field devices at the non-Fieldbus I/O module for the current values of the non-Fieldbus process control parameters.

2. The interface module of claim 1, wherein the controller is programmed to cause the Fieldbus I/O module to request the current values of the Fieldbus process control parameters having records in the table from the corresponding Fieldbus field devices using queued, unscheduled communications on each occurrence of receiving a pass token message at the Fieldbus I/O module from the Fieldbus process control network.

3. The interface module of claim 1, wherein the controller is programmed to cause the Fieldbus I/O module to request the current values of the Fieldbus process control parameters having records in the table from the corresponding Fieldbus field devices after a predetermined period of time elapses after the Fieldbus I/O module issue previous requests for the current values of the Fieldbus process control parameters.

4. The interface module of claim 1, wherein the controller is programmed to cause the Fieldbus I/O module to request the current values of the Fieldbus process control parameters having records in the table from the corresponding Fieldbus field devices in response to receiving the request messages from the non-Fieldbus field devices at the first non-Fieldbus I/O module for the current values of the associated non-Fieldbus process control parameters.

5. The interface module of claim 1, wherein the Fieldbus process control network includes a plurality of segments each having at least one Fieldbus field device operatively connected thereto, the interface module comprising a plurality of Fieldbus I/O modules each being operatively connected to the controller and one of the segments of the Fieldbus process control network, each Fieldbus I/O module being adapted to transmit and receive Fieldbus protocol messages on the corresponding one of the segments, the controller being programmed to cause the one of the Fieldbus I/O modules operatively connected to the one of the segments to which the corresponding one of the Fieldbus field devices is operatively connected to transmit messages to and receive messages from Fieldbus field devices on the corresponding one of the segments of the Fieldbus process control network.

6. The interface module of claim 1, wherein the first non-Fieldbus I/O module is an Internet-compatible I/O module and the field devices of the first non-Fieldbus process control network perform process control using an Internet-based communication protocol.

7. The interface module of claim 6, wherein the controller is programmed to communicate with a user interface operatively connected to the Internet-compatible I/O module and to cause the Internet-compatible I/O module to transmit messages to and receive messages from the user interface.

8. The interface module of claim 1, comprising an Internet I/O module operatively connected to the controller, the controller being programmed to communicate with a user interface operatively connected to the Internet I/O module to transmit messages to and receive messages from the user interface.

9. The interface module of claim 8, wherein the user interface is programmed to function as a web browser and the controller is programmed to function as a web server.

10. The interface module of claim 1, comprising a second non-Fieldbus I/O module operatively connected to the controller, the controller being programmed to cause the second non-Fieldbus I/O module to transmit messages to and receive messages from non-Fieldbus devices on a non-Fieldbus process control network.

11. The interface module of claim 10, wherein the second non-Fieldbus I/O module is operatively connected to the first non-Fieldbus process control network, the controller being programmed to cause the second non-Fieldbus I/O module to transmit messages to and receive messages from the non-Fieldbus field devices on the first non-Fieldbus process control network.

12. The interface module of claim 10, wherein the process control system includes a second non-Fieldbus process control network having a plurality of non-Fieldbus field devices, wherein the second non-Fieldbus I/O module is operatively connected to the second non-Fieldbus process control network, the controller being programmed to cause the second non-Fieldbus I/O module to transmit messages to and receive messages from the non-Fieldbus field devices on the second non-Fieldbus process control network.

13. The interface module of claim 12, wherein the non-Fieldbus field devices of the first non-Fieldbus process control network communicate using a first communication protocol and the non-Fieldbus field devices of the second non-Fieldbus process control network communicate using a second communication protocol, and wherein the first communication protocol is different from the second communication protocol.

14. The interface module of claim 13, wherein the first communication protocol is an Internet-based communication protocol and the second communication protocol is a non-Internet based communication protocol.

15. A method of exchanging process control information between a Fieldbus process control network having a plurality of Fieldbus field devices and a non-Fieldbus process control network having a plurality of non-Fieldbus field devices, the method including the steps of:

operatively connecting an interface module to the Fieldbus process control network and to the non-Fieldbus process control network, the interface module being configured to transmit and receive Fieldbus protocol messages on the Fieldbus process control network and to transmit and receive non-Fieldbus protocol messages on the non-Fieldbus process control network;

storing in the interface module a table containing information for Fieldbus process control parameters of the Fieldbus process control network that are mapped to process control parameters of the non-Fieldbus process control network, wherein the table includes a record for each Fieldbus process control parameter mapped to a process control parameter of the non-Fieldbus process control network, and wherein each record in the table includes information identifying the process control parameter of the Fieldbus process control network, a value of the Fieldbus process control parameter, and an identifier for the corresponding process control parameter of the non-Fieldbus process control network, causing the interface module to request current values of the Fieldbus process control parameters having records in the table from the corresponding Fieldbus field devices in the Fieldbus process control network, storing the current values of the Fieldbus process control parameters in the table with the identifiers for the corresponding process control parameters of the non-Fieldbus process control network, and causing the interface module to transmit response messages to the field devices of the non-Fieldbus process control network with the current values of the Fieldbus process control parameters stored in the table and the identifiers for the corresponding process control parameters of the non-Fieldbus process control network in response to receiving request messages from the field devices of the non-Fieldbus process control network at the interface module for the current values of the associated process control parameters of the non-Fieldbus process control network.

16. A method of claim 15, further comprising causing the interface module to request the current values of the Fieldbus process control parameters having records in the table from the corresponding Fieldbus field devices using queued, unscheduled communications on each occurrence of receiving a pass token message at the interface module from the Fieldbus process control network.

17. The method of claim 15, further comprising causing the interface module to request the current values of the Fieldbus causing the interface module to request the current values of the Fieldbus process control parameters having records in the table from the corresponding Fieldbus field devices after a predetermined period of time elapses after the interface module issued previous requests for the current values of the Fieldbus process control parameters.

18. The method of claim 15, further comprising causing the interface module to request the current values of the Fieldbus process control parameters from the corresponding Fieldbus field devices in response to receiving the request messages from the field devices of the non-Fieldbus process control network at the interface module for the current values of the associated process control parameters of the non-Fieldbus process control network.

19. The method of claim 15, further comprising operatively connecting the interface module to a user interface, the interface module being adapted to transmit Internet protocol messages to and receive Internet protocol messages from the user interface.

20. The method of claim 19, wherein the user interface is programmed to function as a web browser and the interface module is programmed to function as a web server.

21. The method of claim 19, further comprising causing the interface module to transmit information relating to a process control parameter to the user interface in response to receiving a request message from the user interface at the interface module.

22. The method of claim 19, further comprising updating the table to associate a process control parameter of the Fieldbus process control network with a process control parameter of the non-Fieldbus process control network in response to receiving a table update message from the user interface at the interface module.

23. The method of claim 19, further comprising causing the interface module to transmit a response message to the user interface with the current value of a Fieldbus process control parameter, information relating to the Fieldbus process control parameter, and the associated process control parameter of the non-Fieldbus process control network in response to receiving a request message from the user interface at the interface module for the process control parameter of the non-Fieldbus process control network.

24. The method of claim 15, further comprising providing a second operative connection of the interface module to the non-Fieldbus process control network, the interface module being configured to transmit and receive non-Fieldbus protocol messages on the non-Fieldbus process control network via the second operative connection.

25. The method of claim 15, further comprising operatively connecting the interface module to a second non-Fieldbus process control network having a plurality of non-Fieldbus field devices, the interface module being configured to transmit and receive non-Fieldbus protocol messages on the second non-Fieldbus process control network.

26. The method of claim 25, wherein the non-Fieldbus field devices of the first non-Fieldbus process control network communication using a first communication protocol and the non-Fieldbus field devices of the second non-Fieldbus process control network communicate using a second communication protocol, and wherein the first communication protocol is different from the second communication protocol.

27. The method of claim 26, wherein the first communication protocol is an Internet-based communication protocol and the second communication protocol is a non-Internet based communication protocol.

28. An interface module for use in a process control system including a Fieldbus process control network having a plurality of Fieldbus field devices and a Profibus DP process control network having a plurality of Profibus DP field devices, the interface module operatively connecting the Fieldbus process control network to the Profibus DP process control network and configured to facilitate the exchange of process control information between the Fieldbus process control network and the Profibus DP process control network, the interface module comprising:

a Fieldbus I/O module operatively connected to the Fieldbus process control network and configured to transmit and receive Fieldbus protocol messages on the Fieldbus process control network;

a Profibus DP I/O module operatively connected to the Profibus DP process control network and configured to transmit and receive Profibus DP protocol messages on the Profibus DP process control network; and a controller operatively connected to the Fieldbus I/O module and the Profibus DP I/O module, the controller comprising a processor and a memory operatively connected to the processor, the controller being programmed to store in the memory a service access point table containing information for Fieldbus process control parameters of the Fieldbus process control network that are mapped to corresponding Profibus DP service access points of the Profibus DP process control network, wherein the service access point table includes a record for each Fieldbus process control parameter mapped to a Profibus DP service access point, the controller being programmed to cause the Fieldbus I/O module to request current values of the Fieldbus process control parameters having records in the service access point table from the corresponding Fieldbus field devices, the controller being programmed to store the current values of the Fieldbus process control parameters having records in the service access point table with the associated Profibus DP service access points, and the controller being programmed to cause the Profibus DP I/O module to transmit response messages to the Profibus DP field devices with the current values of the Fieldbus process control parameters stored in the service access point table and the associated Profibus DP service access points in response to receiving request messages from the Profibus DP field devices at the Profibus DP I/O module for the current values of the associated Profibus DP service access points.

29. The interface module of claim 28, wherein the controller is programmed to cause the Fieldbus I/O module to request the current values of the Fieldbus process control parameters having records in the service access point table from the corresponding Fieldbus field devices using queued, unscheduled communications on each occurrence of receiving a pass token message at the Fieldbus I/O module from the Fieldbus process control network.

30. The interface module of claim 28, wherein the controller is programmed to cause the Fieldbus I/O module to request the current values of the Fieldbus process control parameters having records in the service access point table from the corresponding Fieldbus field devices after a predetermined period of time elapses after the Fieldbus I/O module issued previous requests for the current values of the Fieldbus process control parameters.

31. The interface module of claim 28, wherein the controller is programmed to cause the Fieldbus I/O module to request the current values of the Fieldbus process control parameters having records in the service access point table from the corresponding Fieldbus field devices in response to receiving the request messages from the Profibus DP field devices at the Profibus DP I/O module for the current values of the associated Profibus DP service access points.

32. The interface module of claim 28, wherein the Fieldbus process control network includes a plurality of segments each having at least one Fieldbus field device operatively connected thereto, the interface module comprising a plurality of Fieldbus I/O modules each being operatively connected to the controller and one of the segments of the Fieldbus process control network, each Fieldbus I/O module being adapted to transmit and receive Fieldbus protocol messages on the corresponding one of the segments, the controller being programmed to cause the one of the Fieldbus I/O modules operatively connected to the one of the segments to which the corresponding one of the Fieldbus field devices is operatively connected to request a current value of the at least one Fieldbus process control parameter.

33. The interface module of claim 28, comprising an Ethernet I/O module operatively connected to the controller and to a user interface, and being adapted to transmit Ethernet protocol messages to and receive Ethernet protocol messages from the user interface.

34. The interface module of claim 33, wherein the user interface is programmed to function as a web browser and the controller is programmed to function as a web server.

35. The interface module of claim 33, wherein the controller is programmed to cause the Ethernet I/O module to transmit information relating to a Fieldbus process control parameter to the user interface in response to receiving a request message from the user interface at the Ethernet I/O module.

36. The interface module of claim 33, wherein the controller is programmed to update the service access point table in the memory to associate a Fieldbus process control parameter of the Fieldbus process control network with a Profibus DP service access point of the Profibus DP process control network in response to receiving a service access point table update message from the user interface at the Ethernet I/O module.

37. The interface module of claim 33, wherein the controller is programmed to cause the Ethernet I/O module to transmit a response message to the user interface with the current value of a Fieldbus process control parameter, information relating to the Fieldbus process control parameter, and the associated Profibus DP service access point in response to receiving a request message from the user interface at the Ethernet I/O module for the service access point.

38. A process control system comprising:

a Fieldbus process control network having a plurality of Fieldbus field devices;

a Profibus DP process control network having a plurality of Profibus DP field devices; and an interface module operatively connecting the Fieldbus process control network to the Profibus DP process control network and configured to facilitate the exchange of process control information between the Fieldbus process control network and the Profibus DP process control network, the interface module comprising:

a Fieldbus I/O module operatively connected to the Fieldbus process control network and configured to transmit and receive Fieldbus protocol messages on the Fieldbus process control network, a Profibus DP I/O module operatively connected to the Profibus DP process control network and configured to transmit and receive Profibus DP protocol messages on the Profibus DP process control network, and a controller operatively connected to the Fieldbus I/O module and the Profibus DP I/O module, the controller comprising a processor and a memory operatively connected to the processor, the controller being programmed to store in the memory a service access point table containing information for Fieldbus process control parameters of the Fieldbus process control network that are mapped to corresponding Profibus DP service access points of the Profibus DP process control network, wherein the service access point table includes a record for each Fieldbus process control parameter mapped to a Profibus DP service access point, and wherein each record in the register map table includes information identifying the Fieldbus process control parameter, a value of the Fieldbus process control parameter, and the Profibus DP service access point to which the Fieldbus process control parameter is mapped, the controller being programmed to cause the Fieldbus I/O module to request current values of the Fieldbus process control parameters having records in the service access point table from the corresponding Fieldbus field devices, the controller being programmed to store the current values of the Fieldbus process control parameters having records in the service access point table with the associated Profibus DP service access points, and the controller being programmed to cause the Profibus DP I/O module to transmit response messages to the Profibus DP field devices with the current values of the Fieldbus process control parameters stored in the service access point table and the associated Profibus DP service access points in response to receiving request messages from the Profibus DP field devices at the Profibus DP I/O module for the current values of the associated Profibus DP service access points.

39. The process control system of claim 38, wherein the controller of the interface module is programmed to cause the Fieldbus I/O module to request the current values of the Fieldbus process control parameters having records in the service access point table from the corresponding Fieldbus field devices using queued, unscheduled communications on each occurrence of receiving a pass token message at the Fieldbus I/O module from the Fieldbus process control network.

40. The process control system of claim 38, wherein the controller of the interface module is programmed to cause the Fieldbus I/O module to request the current values of the Fieldbus process control parameters having records in the service access point table from the corresponding Fieldbus field devices after a predetermined period of time elapses after the Fieldbus I/O module issued previous requests for the current values of the Fieldbus process control parameters.

41. The process control system of claim 38, wherein the controller of the interface module is programmed to cause the Fieldbus I/O module to request the current values of the Fieldbus process control parameters having records in the service access point table from the corresponding Fieldbus field devices in response to receiving the request messages from the Profibus DP field devices at the Profibus DP I/O module for the current values of the associated Profibus DP service access points.

42. The process control system of claim 38, wherein the Fieldbus process control network includes a plurality of segments each having at least one Fieldbus field device operatively connected thereto, and wherein the interface module comprises a plurality of Fieldbus I/O modules each being operatively connected to the controller and one of the segments of the Fieldbus process control network, each Fieldbus I/O module being adapted to transmit and receive Fieldbus protocol messages on the corresponding one of the segments, the controller being programmed to cause the one of the Fieldbus I/O modules operatively connected to the one of the segments to which the corresponding one of the Fieldbus field devices is operatively connected to request a current value of the at least one Fieldbus process control parameter.

43. The process control system of claim 38, wherein the interface module comprises an Ethernet I/O module operatively connected to the controller, the process control system comprising a user interface operatively connected to the Ethernet I/O module, the Ethernet I/O module being adapted to transmit Ethernet protocol messages to and receive Ethernet protocol messages from the user interface.

44. The process control system of claim 43, wherein the user interface is programmed to function as a web browser and the controller is programmed to function as a web server.

45. The process control system of claim 43, wherein the controller is programmed to cause the Ethernet I/O module to transmit information relating to a Fieldbus process control parameters stored in the service access point table to the user interface in response to receiving a request message from the user interface at the Ethernet I/O module.

46. The process control system of claim 43, wherein the controller is programmed to update the service access point table in the memory to associate a Fieldbus process control parameter of the Fieldbus process control network with a Profibus DP service access point of the Profibus DP process control network in response to receiving a service access point table update message from the user interface at the Ethernet I/O module.

47. The process control system of claim 43, wherein the controller is programmed to cause the Ethernet I/O module to transmit a response message to the user interface with the current values of the Fieldbus process control parameters, information relating to the Fieldbus process control parameters, and the associated Profibus DP service access points in response to receiving a request message from the user interface at the Ethernet I/O module for the service access point table.

48. A method of exchanging process control information between a Fieldbus process control network having a plurality of Fieldbus field devices and a Profibus DP process control network having a plurality of Profibus DP field devices, the method including the steps of:

operatively coupling an interface module to the Fieldbus process control network and to the Profibus DP process control network, the interface module configured to transmit and receive Fieldbus protocol messages on the Fieldbus process control network and to transmit and receive Profibus DP protocol messages on the Profibus DP process control network.

storing in the interface module a service access point table containing information for the Fieldbus process control parameters of the Fieldbus process control network that are mapped to corresponding Profibus DP service access points of the Profibus DP process control network, wherein the service access point table includes a record for each Fieldbus process control parameter mapped to a Profibus DP service access point, and wherein each record in the service access point table includes information identifying the Fieldbus process control parameter, a value of the Fieldbus process control parameter, and the Profibus DP service access point to which the Fieldbus process control parameter is mapped, causing the interface module to request current values of the Fieldbus process control parameters having records in the service access point table from the corresponding Fieldbus field devices, storing the current values of the Fieldbus process control parameters having records in the service access point table with the associated Profibus DP service access points, and causing the interface module to transmit response messages to the Profibus DP field devices with the current values of the Fieldbus process control parameters stored in the service access point table and the associated Profibus DP service access points in response to receiving request messages from the Profibus DP field devices at the interface module for the current values of the associated Profibus DP service access points.

49. The method of claim 48, further including the step of causing the interface module to request the current values of the Fieldbus process control parameters having records in the service access point table from the corresponding Fieldbus field devices using queued, unscheduled communications on each occurrence of receiving a pass token message at the interface module from the Fieldbus process control network.

50. The method of claim 48, further including the step of causing the interface module to request the current values of the Fieldbus process control parameters having records in the service access point table from the corresponding Fieldbus field devices after a predetermined period of time elapses after the interface module issued previous requests for the current values of the Fieldbus process control parameters.

51. The method of claim 48, further including the step of causing the interface module to request the current values of the Fieldbus process control parameters having records in the service access point table from the corresponding Fieldbus field devices in response to receiving the request messages from the Profibus DP field devices at the interface module for the current values of the associated Profibus DP service access points.

52. The method of claim 48, wherein the Fieldbus process control network includes a plurality of segments each having at least one Fieldbus field device operatively connected thereto, the method further including the steps of:
    operatively coupling the interface module to the segments of the Fieldbus process control network; and
    causing the interface module to transmit a request for a current value of a Fieldbus process control parameter on the segment to which a corresponding Fieldbus field device is operatively connected.

53. The method of claim 48, further comprising the step of operatively coupling the interface module to a user interface, the interface module being adapted to transmit Ethernet protocol messages to and receive Ethernet protocol messages from the user interface.

54. The method of claim 53, wherein the user interface is programmed to function as a web browser and the interface module is programmed to function as a web server.

55. The method of claim 53, further including the step of causing the interface module to transmit information relating to a Fieldbus process control parameter to the user interface in response to receiving a request message from the user interface at the interface module.

56. The method of claim 53, further including the step of updating the service access point table in the memory to associate a Fieldbus process control parameter of the Fieldbus process control network with a Profibus DP service access point of the Profibus DP process control network in response to receiving a service access point table update message from the user interface at the interface module.

57. The method of claim 53, further including the step of causing the interface module to transmit a response message to the user interface with the current value of a Fieldbus process control parameter, information relating to the Fieldbus process control parameter, and the associated Profibus DP service access point in response to receiving a request message from the user interface at the interface module for the service access point.

* * * * *

UNITED STATES PATENT AND TRADEMARK OFFICE
CERTIFICATE OF CORRECTION

| | | |
|---|---|---|
| PATENT NO. | : 7,246,194 B2 | |
| APPLICATION NO. | : 10/931165 | |
| DATED | : July 17, 2007 | |
| INVENTOR(S) | : Robert Train et al. | |

It is certified that error appears in the above-identified patent and that said Letters Patent is hereby corrected as shown below:

On the First Page:

At field (75), 4th named Inventor, "Inner Grove Heights" should be -- West St. Paul --.

At field (75), add -- Donald R. Lattimer, Chaska, MN --.

At field (75), add -- Michael J. Green, Plymouth, MN --.

On Page 2:

At field (56), Other Publications, 4th reference, "Valve-Wold" should be -- Valve-World --.

In the Claims:

At Column 18, line 58, "being adapted" should be -- configured --.

At Column 19, lines 11-12, "Fielbus control" should be -- Fieldbus process control --.

At Column 19, line 45, "issue" should be -- issued --.

At Column 21, lines 44-45, "Fieldbus causing the interface module to request the current values of the Fieldbus process" should be -- Fieldbus process --.

UNITED STATES PATENT AND TRADEMARK OFFICE
CERTIFICATE OF CORRECTION

PATENT NO.       : 7,246,194 B2
APPLICATION NO.  : 10/931165
DATED            : July 17, 2007
INVENTOR(S)      : Robert Train et al.

It is certified that error appears in the above-identified patent and that said Letters Patent is hereby corrected as shown below:

At Column 26, line 39, "network." should be -- network; --.

Signed and Sealed this

Fifth Day of August, 2008

JON W. DUDAS
*Director of the United States Patent and Trademark Office*